United States Patent
Vehmeijer et al.

(10) Patent No.: US 12,172,870 B2
(45) Date of Patent: Dec. 24, 2024

(54) HANDS OFF MONOPILE HOISTING TOOL

(71) Applicant: ITREC B.V., Schiedam (NL)

(72) Inventors: Terence Willem August Vehmeijer, Schiedam (NL); Tim Van Den Donker, Schiedam (NL)

(73) Assignee: ITREC B.V., Schiedam (NL)

( * ) Notice: Subject to any disclaimer, the term of this patent is extended or adjusted under 35 U.S.C. 154(b) by 158 days.

(21) Appl. No.: 17/800,686

(22) PCT Filed: Feb. 17, 2021

(86) PCT No.: PCT/EP2021/053875
§ 371 (c)(1),
(2) Date: Aug. 18, 2022

(87) PCT Pub. No.: WO2021/165314
PCT Pub. Date: Aug. 26, 2021

(65) Prior Publication Data
US 2023/0348232 A1    Nov. 2, 2023

(30) Foreign Application Priority Data
Feb. 19, 2020    (NL) ........................... 2024947

(51) Int. Cl.
*B66C 1/10* (2006.01)
*B66C 1/56* (2006.01)

(52) U.S. Cl.
CPC .............. *B66C 1/108* (2013.01); *B66C 1/56* (2013.01)

(58) Field of Classification Search
CPC ........... B66C 1/108; B66C 1/56; B66C 1/427; B66C 1/42
See application file for complete search history.

(56) References Cited

U.S. PATENT DOCUMENTS

| | | | |
|---|---|---|---|
| 9,580,882 B2* | 2/2017 | Mulderij | E02D 13/04 |
| 2022/0041409 A1* | 2/2022 | Hooftman | F16B 2/06 |
| 2023/0137682 A1* | 5/2023 | Donkers | E02B 17/0013 |
| | | | 405/224 |

FOREIGN PATENT DOCUMENTS

| | | |
|---|---|---|
| DE | 202009006507 U1 | 8/2009 |
| EP | 3574149 A1 | 12/2019 |

(Continued)

OTHER PUBLICATIONS

International Search Report, issued in PCT/EP2021/053875, PCT/ISA/210, dated Apr. 16, 2021.
(Continued)

*Primary Examiner* — Emmanuel M Marcelo
(74) *Attorney, Agent, or Firm* — Birch, Stewart, Kolasch & Birch, LLP

(57) ABSTRACT

A tool and method for hoisting an longitudinal end of an offshore wind turbine component which is in a horizontal orientation. The tool is after being attached to a lifting block to be moved into a proximate position in which gripping members of the tool are longitudinally spaced from the longitudinal end but the radial contour of the tool at least overlaps with the radial contour of the longitudinal end. While the gripping members are in a retracted position guiding actuators can move the tool from the proximate position into a gripping position longitudinally aligned with the longitudinal end in which the gripping members are movable to engage said surface of the longitudinal end, thereby connecting the longitudinal end to the tool and suspending the longitudinal end from the lifting block so that the longitudinal end can consequently be hoisted.

20 Claims, 4 Drawing Sheets

(56) References Cited

FOREIGN PATENT DOCUMENTS

| GB | 2429966 A | 3/2007 | |
|---|---|---|---|
| WO | WO-2016184905 A1 * | 11/2016 | ............... B66C 1/54 |
| WO | WO 2018/139918 A1 | 8/2018 | |
| WO | WO 2020/020821 A1 | 1/2020 | |
| WO | WO-2020020819 A1 * | 1/2020 | ............. B66C 1/108 |

OTHER PUBLICATIONS

Search Report issued in NL priority application 2024947, dated Feb. 19, 2020.
Written Opinion of the International Searching Authority, issued in PCT/EP2021/053875, PCT/ISA/237, dated Apr. 16, 2021.

* cited by examiner

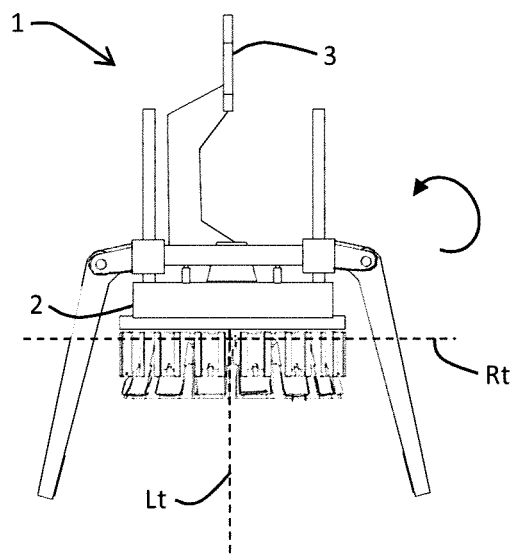
▲ Fig.2A
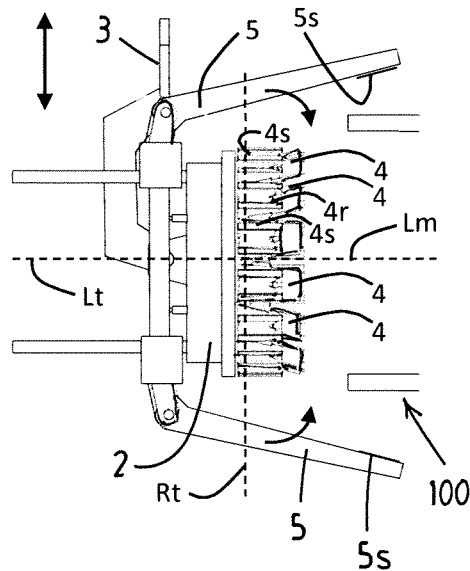
▲ Fig.2B
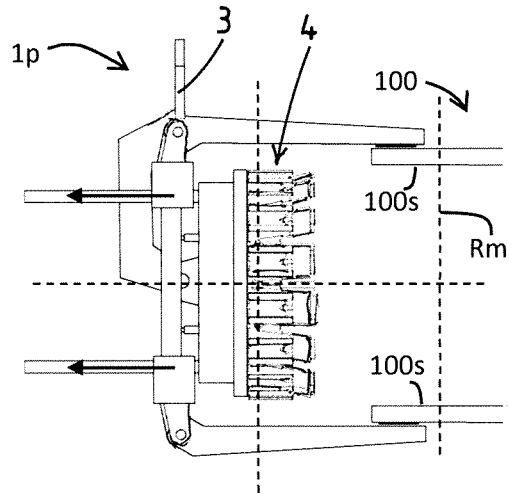
▲ Fig.2C
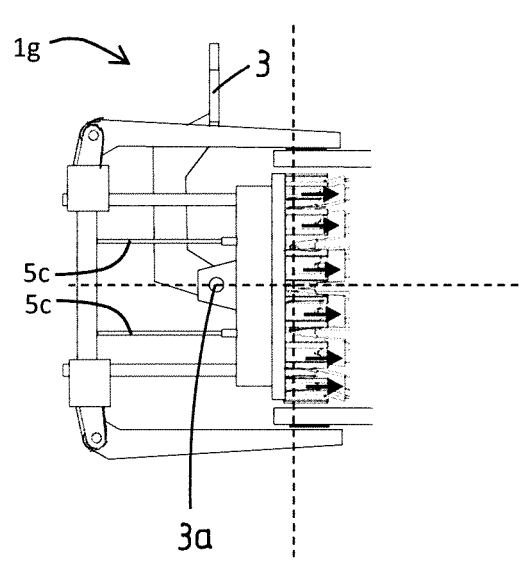
▲ Fig.2D
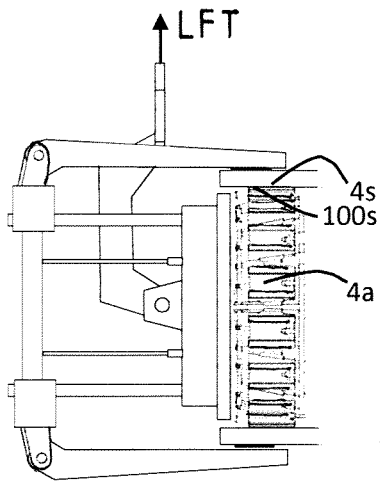
◀ Fig.2E
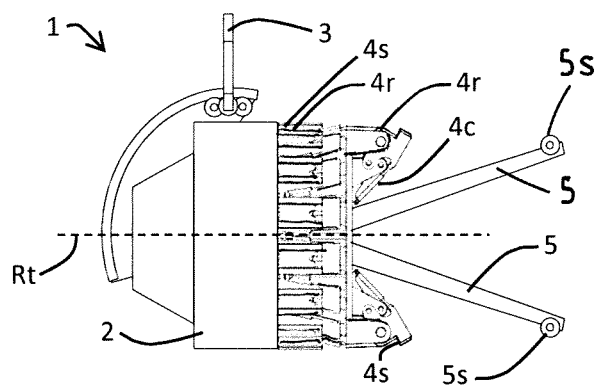
▲ Fig.3

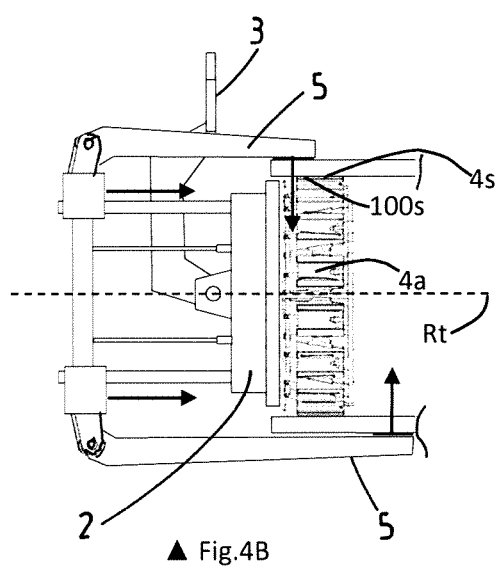
▲ Fig.4B
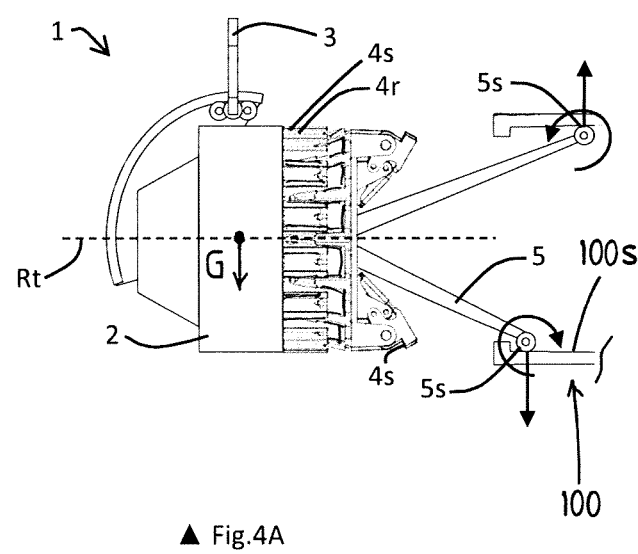
▲ Fig.4A

HANDS OFF MONOPILE HOISTING TOOL

FIELD OF THE INVENTION

The invention relates to a method and a tool for the installation of a wind turbine component, for example a monopile of an offshore wind turbine. In the case of a monopile, the monopile may be driven into the seabed by means of a pile driving device. Once the monopile type foundation is installed, the wind turbine can be installed thereon at once as a whole or by assembling the wind turbine in parts on the monopile foundation.

In a known method for installing an offshore wind turbine having a monopile as its foundation, the components are firstly transported to the installation site on one or more vessels in a horizontal orientation. By means of a heavy lift crane and a hoisting tool suspended from a lifting block of the crane the monopile is upended, generally by hoisting the upper end of the monopile while the lower end thereof is being held by a pivoting upending tool, that is mounted on the vessel or is being supported by another crane. The hoisting tool is used to retain the upper end of the monopile during this process. Consequently, the monopile is lowered onto the seabed. It is common to make use of a pile holder, or pile gripper as called in the field, in order to keep the monopile vertically, e.g. to ensure that the monopile is driven vertically into the seabed during the later pile driving process.

There is a trend towards large wind turbines, e.g. of at least 4 MW or even more than 10 MW, and a desire to install offshore wind turbines at locations with rather significant water depths. Both result in larger and heavier monopile foundations. At the moment, monopiles need to be installed that are have a length of 100 meters or more, e.g. 120 meters or more. Diameters of the monopile are in the range of e.g. 8-12 meters, e.g. 11 meters. The material for the monopile is commonly steel and the wall thickness may, e.g., be in the range between 10 and centimetres. The weight of such monopiles may be more than 1000 mt, possibly 1300 mt or above. Whilst monopile foundations are nowadays seen as efficient, the enormous dimensions and weight pose increasingly high requirements to the cranes and tools used, and increases the complexity and duration of the operation of thereof in the installation process.

BACKGROUND OF THE INVENTION

An example of a hoisting tool used for the upending is disclosed in EP3574149. Another example is disclosed in DE202009006507U1.

Document WO2020/020821 discloses a hoisting tool which is configured to engage a longitudinal end of a monopile and to retain the longitudinal end during hoisting thereof by means of a crane, e.g. in a process of upending. The known tool has radially pivotal resilient arms which form guiding members of the tool. A rolling body is provided at the free end of each arm. The rolling bodies each form a guiding surface of the guiding member embodied as resilient arm. An actuator between the frame and each pivotal arm drives a radial relative movement, wherein the roller bodies are radially moved relative to the gripping members. In a range of proximate positions of the tool, in which the gripper members are longitudinally spaced from the longitudinal end of the monopile, the roller bodies of the arms engage the longitudinal end and the radial contour of the tool at least overlaps with the radial contour of the longitudinal end. The rolling bodies engage at mutually spaced angular locations on the longitudinal end, such as to restrict movement of the tool and thereby of the gripping members, in at least radial directions relative to the longitudinal end. The rolling bodies, during a movement of the tool from the range of proximate positions in a direction towards the gripping position, maintain the engagement of the longitudinal end, so as to guide the tool towards the gripping position.

In particular, the increasing sizes of the monopiles complicate the positioning of the hoisting tool when connecting it to the upper end of the monopile. For instance, the great length may entail the upper end to be outside of the contour of the upper deck when the pile needs to be upended, e.g. protrudes outside the vessel, e.g. the pile extending from a lateral side of the deck with the upper end. In that case the hoisting tool is particularly difficult to reach and control when positioning it close to the upper end.

Before upending the monopile by means of the hoisting tool, the hoisting tool is to be connected to the upper end of the monopile. Thereto, it is first positioned relative to the monopile such as to enable it to engage the upper end of the monopile, in order for it to consequently retain the monopile during upending. This positioning is currently done with the aid of personnel on the deck of the vessel, e.g. with the aid of cables connected to the hoisting tool, and/or with the aid of tugger cables.

OBJECT OF THE INVENTION

The present invention aims to provide a tool and a method, which enable an alternative or improved way of connecting the hoisting tool to the wind turbine component. In particular, the current invention aims to provide a hoisting tool and a method which reduce the time and effort with which the hoisting tool is connected to a longitudinal end, e.g. an upper end, of the monopile.

The invention is also suitable for hoisting a longitudinal end of a transition piece, and a longitudinal end of other objects, e.g. elongate objects, e.g. parts of a wind turbine or its foundation, having a longitudinal end that may be hoisted by the hoisting tool, e.g. a monopile, a pile driving device, a rotor blade of a wind turbine, a mast, or a mast segment. The invention also relates to methods wherein the tool is used for hoisting a longitudinal end of any of these other objects.

Herein, the term longitudinally is to be interpreted as a direction along or parallel to a longitudinal axis of the wind turbine component, e.g. of the monopile, including when the tool is connected thereto—in this case the longitudinal direction of the tool corresponds to that of the wind turbine component. Similarly, radially means a direction in or parallel to the radial direction of the wind turbine component or with respect to the longitudinal direction thereof. Also when referring separately to the hoisting tool, a longitudinal direction is to be interpreted as a direction of the tool along or parallel to a longitudinal axis of the wind turbine component when a longitudinal end thereof is connected to the tool. Similarly, a radial direction of the tool means a radial direction with respect to the longitudinal direction of the tool. The term upper end means the end of the component which is in an installation position after upending the uppermost end of the component. When the component is not to be upended, e.g. to be displaced by the crane in a horizontal orientation, the term upper end can be taken to mean one of the longitudinal ends of the component.

SUMMARY OF THE INVENTION

The invention provides a hoisting tool which is configured to engage a longitudinal end, e.g. an upper end, of an offshore wind turbine component which is in a horizontal orientation, e.g. a pile, for example a monopile, or a mast, and to retain the longitudinal end during hoisting thereof by means of a crane, e.g. in a process of upending said component.

The tool comprises a frame, provided with:
an attachment member, configured to attach the tool to a lifting block of the crane,
multiple mobile gripping members, angularly mutually spaced with respect to a longitudinal direction of the tool, each configured to:
in an active position thereof relative to the frame, engage a surface of the longitudinal end of the component by a gripping surface thereof when the tool is in a gripping position in which the tool is longitudinally aligned with and longitudinally within the contour of the longitudinal end, the gripping members each facing said surface of the longitudinal end, so as to connect the longitudinal end to the tool and retain the longitudinal end during hoisting thereof by means of said crane while the tool is attached to the lifting block,
in a retracted position thereof relative to the frame, enable passing of the gripping members along a circumference of the longitudinal end during a movement of the tool from a position of the tool longitudinally spaced from the longitudinal end towards the gripping position of the tool,
gripper actuators that are associated with at least one of the gripping members, and are configured to drive a movement of the associated gripping members into the retracted position and into the active position thereof, when the tool is in the gripping position, and
one or more guiding members, each configured to, in a range of proximate positions of the tool, in which the gripping members are longitudinally spaced from the longitudinal end but the radial contour of the tool at least overlaps with the radial contour of the longitudinal end, engage the longitudinal end by a guiding surface of the guiding member, at mutually spaced angular locations on the longitudinal end which are spaced from the gripping surface of the gripping members both radially, and longitudinally in the direction towards the longitudinal end, such as to restrict movement of the tool, and therewith of the gripping members, in at least radial directions relative to the longitudinal end, and configured to, during a movement of the tool from said range of proximate positions in a direction towards the gripping position, maintain said engagement of the longitudinal end, such as to guide the tool towards the gripping position,
one or more guiding actuators, associated with the one or more guiding members and configured to drive a movement of the guiding surfaces of the associated guiding members relative to the gripping members.

According to the invention, the one or more guiding actuators are each configured to, while the one or more guiding members engage the longitudinal end of the offshore wind turbine component by the one or more guiding surfaces, drive a longitudinal movement of the respective guiding surfaces of the associated guiding members relative to the gripping members such that the tool is moved to the gripping position thereof.

Compared to the prior art approaches for moving the tool into the gripping position thereof, the provision of one or more guiding actuators that are each configured to cause said longitudinal movement provides significant benefits in terms of efforts of personnel, efficiency of the operation, reliability of the process, etc.

In embodiments, these one or more guiding actuators may be employed also during the initial phase of engagement of the guiding surfaces with the longitudinal end, e.g. enhancing the alignment and engagement of the tool with the longitudinal end.

For example, each guiding surface is provided with an independently controllable guiding actuator to cause independent control of the motion in longitudinal direction.

In embodiments, the one or more guiding surface of the one or more guiding members are each driven relative to the respective gripping member by the one or more guiding actuators to cause the longitudinal relative movement and move the tool towards the gripping position thereof.

In embodiments, the guiding surface of at least one of the guiding members forms part of a circumferential surface of one or more rotatable elements, e.g. of one roller or of two longitudinally spaced rollers of a longitudinally extending caterpillar, wherein at least one of said guiding actuators is configured to drive a rotation of said one or more rotatable elements. For example, in the design disclosed in WO2020/020821, it is envisaged that the rolling bodies on the free ends of the resilient arms each are driven to rotate by means of a respective guiding actuator allowing to move the tool to the gripping position thereof.

In embodiments, e.g. as in the design disclosed in WO2020/020821, the one or more guiding actuators are further configured to drive a radial movement, wherein the respective guiding surfaces of the guiding members are radially moved relative to the gripping members, e.g. the guiding members being pivotal relative to the frame to cause the radial movement. For example, at least one of said guiding actuators associated with the at least one of the guiding members is configured to drive the radial relative movement, e.g. pivoting movement, e.g. embodied as a hydraulic or pneumatic cylinder connected with one end to the frame and with another end to the guiding member it is associated with.

The tool comprises a frame, which is provided with an attachment member. The attachment member is configured to attach the tool to a lifting block of a crane. In a very simple form, such a lifting block is a hook. Such a rigid frame is known in the art and may have many different forms—of which an example is shown in EP3574149. The attachment member is preferably, alike in EP3574149, configured to attach the tool to a lifting block of a crane pivotally about a pivot axis which runs radially horizontally when the tool is connected to the upper end, such as to allow a relative pivoting movement between the monopile or the transition piece and the lifting block during upending of the monopile or of the transition piece from a horizontal to a vertical position while the hoisting tool is connected to the upper end. For this purpose, preferably the attachment member is pivotally connected to the frame, e.g. pivotal around a radial horizontal pivot axis, such as to allow a relative pivoting movement between the gripping members and the guiding members of the tool mounted to the frame, thereby enabling, when the tool is connected to the longitudinal end such as to allow the angle between the component and the hoisting direction to increase during hoisting of the longitudinal end to upend the component from a horizontal to a vertical position while the hoisting tool is connected to the longitudinal end.

In particular embodiments, the tool may for this same purpose comprise a pivot joint between the rigid frame and the connection of the attachment member to the lifting block, in particular between the rigid frame and the attachment member. In an embodiment, the attachment member is embodied as an arm or a shackle. In an embodiment, the attachment member comprises a vertically extending element which has a horizontal opening through which a hook of the lifting block is receivable to attach the tool to the lifting block.

The rigid frame is furthermore provided with one or more mobile gripping members and gripping actuators, and multiple guiding members, for example three or four guiding members, and associated guiding actuators.

The mobile gripping members are configured to assume an active position and to assume a retracted position thereof relative to the rigid frame. The gripping members are angularly mutually spaced with respect to a longitudinal direction of the tool. Each gripping member is configured to, in the active position thereof, engage a surface of the longitudinal end of the monopile or of the transition piece by a gripping surface thereof so as to connect the longitudinal end to the tool and retain the longitudinal end during hoisting thereof by means of said crane while the tool is attached. In the gripping position, the tool is longitudinally aligned with the longitudinal end and the gripping members each face the surface of the longitudinal end to be engaged by the gripping members. Preferably, the gripping members are configured to engage an inner surface of the longitudinal end, as is known in the art.

In the retracted position thereof relative to the rigid frame, the gripping members enable passing of the gripping members from a position longitudinally spaced from the longitudinal end, along a circumference of the longitudinal end, during a movement of the tool from a position of the tool longitudinally spaced from the longitudinal end towards a gripping position of the tool. For instance if the gripping members are configured to engage an inner surface of the longitudinal end, the gripping members are configured to in the retracted position pass along the inner circumference of the longitudinal end. Similarly, if the gripping members are configured to engage an outer surface, the gripping members are configured to pass along the outer circumference.

The one or more gripping actuators are each associated with at least one of the gripping members, and are at least configured to drive a movement of the associated gripping members from the retracted position to the active position thereof. The gripping actuators may e.g. be embodied as mechanical springs, hydraulic or pneumatic cylinders, or electric or hydraulic motors.

In embodiments, at least one of the gripping members is embodied as a mobile friction clamp member, configured to in the active position thereof frictionally engage the surface of the longitudinal end, and/or at least one of the gripping members is embodied as a mobile latching member, configured to latch onto the longitudinal end, e.g. to latch underneath a radially inward flange of the monopile or transition piece, when present. Suitable friction clamp members, e.g. wedge members, and latching members are known from e.g. EP3574149, wherein these are also combined in one tool for engaging either an internal tubular surface of the longitudinal end or an internal surface of a radially inwards flange.

Preferably, the one or more gripping members are multiple, e.g. two to twenty, e.g. three or four latching members, or more than ten friction clamp members, arranged such that the gripping surfaces thereof engage the surface of the longitudinal end at different angular positions, e.g. arranged at substantially equal mutual angles with respect to the longitudinal direction of the tool.

When the gripping members are configured to engage an inner surface of the longitudinal end, this inner surface may in particular be a tubular inner surface of the longitudinal end of the monopile or transition piece, so that the gripping surface of each gripping member is directed radially outwardly at least when engaging the inner surface of the longitudinal end of the monopile or transition piece. Therein the gripping members may in particular be embodied as mobile friction clamp members, e.g. wedge members, configured to in the active position thereof frictionally engage the inner surface of the longitudinal end.

The inner surface may also be a radially inwardly extending inner surface of an inwards flange of the monopile or transition piece. This inward flange may be gripped by mobile friction clamp members as the gripper members, however the gripper members are herein preferably embodied as mobile latching members, latching underneath the inward flange of the longitudinal end, against the inner surface thereof.

The gripping members, configured to engage the inner surface, are at least in the retracted positions thereof arranged such that they enable passing thereof from a position longitudinally spaced from the longitudinal end along the inner circumference of the longitudinal end, during a movement towards the gripping position of the tool. To that end the gripping members extend within an inner contour of the longitudinal end in the retracted position, for example within an inner contour of a radially inward flange of the longitudinal end, when present, so that they are longitudinally insertable into the longitudinal end of the wind turbine component towards the gripping position. Therein the movement of the friction clamp members from the retracted to the active positions thereof is such that the gripping surfaces move radially outwards towards the inner surface.

Other embodiments are also envisaged wherein the gripping members are configured to engage an outer surface of the longitudinal end, in particular the tubular outer surface thereof, so that the gripping surface of each gripping member is directed radially inwardly at least when engaging the inner surface of the longitudinal end of the wind turbine component. Therein the gripping members may be embodied as mobile friction clamp members, e.g. wedge members, configured to in the active position thereof frictionally engage the outer surface of the longitudinal end.

Embodiments are also envisaged in which the gripping members comprise one or more gripping members configured to engage an inner surface, and one or more gripping members configured to engage an outer surface of the upper end.

The one or more guiding members of the tool are each configured to, in a range of proximate positions of the tool, in which the gripping members are longitudinally spaced from the longitudinal end but the radial contour of the tool at least overlaps with the radial contour of the longitudinal end, engage the longitudinal end at multiple angular locations on the longitudinal end which are spaced from the gripping surface of the gripping members both radially, and longitudinally in the direction towards the longitudinal end by a guiding surface thereof, such as to restrict movement of the tool, and therewith of the gripping members, in at least radial directions relative to the longitudinal end.

The longitudinal end will, in a practical method, be engaged by the guiding members during a positioning movement of the tool by a crane, relative to the longitudinal end proximate to the longitudinal end, in which movement one or more of the guiding members moves against, e.g. collides with, a surface of the longitudinal end, engaging it. This engagement and the resulting restriction of the movement of the tool relative to the longitudinal end may facilitate the other guiding members to consequently engage the longitudinal end so that multiple guiding members engage the longitudinal end at mutually spaced angular locations on the longitudinal end, further restricting the movement of the tool relative to the longitudinal end. Multiple mutually spaced locations may be engaged by one single guiding member, e.g. having a guiding surface that complements the surface of the component to be engaged and extending over an angular range.

In an embodiment, at least one of the guiding members, e.g. all of the guiding members, is configured to engage an outer surface of the longitudinal end, the guiding surface thereof being directed radially inwardly and at least in said range of proximal positions extending radially outwards from the gripping surfaces of the gripping members.

In an embodiment, at least one of the guiding members, e.g. all of the guiding members, is configured to engage an inner surface of the longitudinal end, the guiding surface thereof being directed radially outwardly, which at least in said range of proximal positions extends radially inwards from the gripping surfaces of the gripping members.

Embodiments are also envisaged in which the guiding members comprise one or more guiding members configured to engage an inner surface, and one or more guiding members configured to engage an outer surface of the upper end.

In an embodiment wherein multiple guiding members are configured to engage the outer surface of the upper end, the guiding surfaces of these guiding members may after the initial engagement of the one or more guiding members be actively moved towards each other, decreasing the radial distance of the guiding surfaces of the other guiding members not yet engaging the longitudinal end to the surface of the longitudinal end to be engaged thereby, and radially closing in the longitudinal end further. Therein the active movement of the one or more guiding member(s) already engaging the longitudinal end towards the other guiding member(s) results in these one or more guiding members pushing off the tool against the engaged surface thereof radially closer to the gripping position, and therewith pushing the guiding surfaces of the other guiding members towards the surface of the longitudinal end to be engaged thereby. This radial approaching of the guiding surfaces may be the result of e.g. an active inwards pivoting of the guiding members relative to the rigid frame, an active inwards translating of the guiding members relative to the rigid frame, and/or an active inwards pivoting or translating of the guiding surfaces relative to the other parts of the guiding members. This may further facilitate the engagement by the guiding members of the upper end and thus the positioning of the tool longitudinally aligned with the gripping position.

Similarly, for this same purpose, in an embodiment wherein multiple guiding members are configured to engage the inner surface of the upper end, the guiding surfaces thereof may be actively moved away from each other. The effect is now that the radial distance of the guiding surfaces of the other guiding member(s) not yet engaging the longitudinal end to the surface of the longitudinal end to be engaged thereby is decreased. The guiding member(s) already engaging the longitudinal end towards the other guiding member(s) results in these one or more guiding members pushing off the tool against the engaged surface thereof radially closer to the gripping position, and therewith pushing the guiding surfaces of the other guiding members towards the surface of the longitudinal end to be engaged thereby. This relative movement may be the result of e.g. an active outwards pivoting of the guiding members relative to the rigid frame, an active outwards translating of the guiding members relative to the rigid frame, and/or an active outwards pivoting or translating of the guiding surfaces relative to the other parts of the guiding members.

Furthermore, the one or more guiding members are each configured to, during a movement of the tool from a proximate position within said range in a direction towards the gripping position, maintain this engagement of the longitudinal end, such as to guide the tool into the gripping position.

The one or more guiding actuators are each associated with at least one of the guiding members.

The guiding actuators are each configured to drive a movement of the guiding surfaces of the associated guiding members relative to the gripping members, e.g. a movement of the guiding surfaces relative to the rigid frame. These movements, preferably, both include the previously discussed radial movement of the guiding surfaces towards engagement of the longitudinal end at multiple angular positions, moving the tool also radially closer to the gripping position, and include longitudinal movements of the guiding surfaces during the engagement at multiple angular positions which move the tool towards the gripping position, which may include both radial and longitudinal movements of the guiding surfaces relative to the gripping surfaces of the gripping members. The latter movements are thus such, that while said guiding members engage the longitudinal end, these also move the gripping members relative to the longitudinal end of the component, such as to move the tool towards the gripping position. Therein, the guiding surfaces being moved during engagement makes that a controlled movement of the gripping members relative to the longitudinal end is possible. For instance, the movement of the guiding surfaces pulls the tool longitudinally towards the longitudinal end by moving the guiding surfaces longitudinally towards the rigid frame while engaging the longitudinal end, and/or pushes the tool radially towards the longitudinal end by moving the guiding surfaces radially inwardly, when the guiding surfaces engage an outer surface of the longitudinal end, or outwardly, when these engage an inner surface of the longitudinal end, relative to the rigid frame against the engaged surface of the longitudinal end, e.g. by radially moving the guiding members relative to the rigid frame and/or the guiding surfaces relative to another part of the guiding members. These radial movements may be established by e.g. pivoting and/or translating of the guiding members and/or the guiding surfaces thereof relative to the rigid frame, as discussed before.

For establishing the longitudinal movement of the guiding surfaces relative to the gripping members, causing the relative movement of the tool including the gripping members towards the gripping position, the guiding surface of a respective guiding member may in embodiments be actively movable with respect to another part of the guiding member to which it is mounted as driven by an associated guiding actuator, which movement causes the longitudinal movement thereof relative to the gripping members. For example, the movement of the guiding surface may be rotational relative to the other parts of the guiding member to which it is mounted. In embodiments the guiding surface is formed by a circumferential surface of one or more rotatable elements mounted to the other parts of the guiding member, for example of one roller or of two longitudinally spaced rollers of a longitudinally extending caterpillar. Therein the guiding actuator associated with the respective guiding member is configured to drive a rotation of said rotatable element(s). The rotation causes the guiding surface to move longitudinally over the engaged surface of the longitudinal end, which causes the rigid frame and therewith the gripping members to move longitudinally relative to the longitudinal end. Preferably such movable surface, and therewith such element, is provided at an outer end of the respective guiding member, the guiding member for example being embodied as a guiding arm extending longitudinally further outwards than the gripping members.

In other embodiments the guiding surface is not movable with respect to another part of the guiding member to which it is mounted, the longitudinal movement of the guiding surface relative to the gripping members being established by a movement of the guiding members relative to the rigid frame as driven by an associated guiding actuator. For example, the guiding surface may be embodied as a frictional pad, a magnet, e.g. an electromagnet which is controllable to further control the positioning of the tool, a suction cup, rigidly connected to another part of the guiding member, e.g. a. When the guiding surface is a frictional pad, the friction of the pad may be achieved by texture of the guiding surface and/or by being made up of a material suitable for this purpose as known in the art. The guiding surface may be shaped complementary to the surface of the longitudinal end to be engaged by the guiding member, extending tangentially over a certain angular range. This range may depend on the number of guiding members provided, and for example be between around 5-175 degrees avoiding angular overlap while engaging the longitudinal end, for example between around 5-175 degrees, e.g. 60 degrees, in case of two guiding members, for example around 5-115 degrees, e.g. 45 degrees, in case of three guiding members and for example between around 5-85 degrees, e.g. 30 degrees, in case of four guiding members, etc. Preferably the guiding surface is provided at an outward end of the guiding member, the guiding member being embodied as a guiding arm extending longitudinally further outwards than the gripping members. The guiding members may be moved longitudinally relative to the rigid frame by means of for example a longitudinally inwards translational movement, driven by the associated guiding actuator being provided between the rigid frame and the guiding member, for example a pneumatic or hydraulic cylinder. The guiding members may also be moved longitudinally relative to the upper end, e.g. the guiding members being embodied as arms, e.g. straight or articulated arms, and the guiding surfaces being provided at free longitudinally outwards ends thereof, e.g. in the form of magnets or suction cups, wherein the arms are actuated to perform a 'walking' movement over the upper end as soon as multiple of the guiding members have engaged the upper end.

The guiding members advantageously engage the longitudinal end while the gripping members are still longitudinally spaced from the longitudinal end, restricting the movement thereof, e.g. resulting in a form-lock and/or friction in shear-directions of the guiding surface, so that an accurate positioning of the tool from the range of proximate positions thereof into the gripping position can be achieved by means of the tool itself instead of by the crane, instead of the less accurately controllable positioning achievable by the crane. The tool thereby advantageously makes possible a method according to the invention in which the positioning of the tool into the gripping position thereof is achieved by firstly a rapid crude positioning of the tool by means of the crane into the range of proximate positions, and secondly an accurate positioning of the tool from the range of proximate positions to the gripping position by means of the tool itself. The guiding capacity of the tool, and the guiding means being comprised by the tool itself, advantageously particularly facilitates connection of the tool to the longitudinal end for subsequent hoisting thereof without the need to by external means, e.g. manually, e.g. using cables, position the tool from proximate positions to the gripping positions.

In use of an embodiment of the tool wherein the guiding surfaces are configured to engage an inner surface of the upper end, as soon as the guiding members engage the upper end and the tool becomes at least partially supported onto the engaged surface of the upper end, a vertical force moment may result from the weight of the tool around the points of contact of lower one(s) of the guiding members with the inner surface. This force moment may be counteracted by an upwards pushing force by the guiding surface(s) of one or more upper one(s) of the guiding members against the inner surface. To prevent the tool from toppling as a result of this force moment, the guiding surface(s) of one or more upper ones of the guiding members may be arranged longitudinally further outwards than the guiding surface(s) of the remaining, lower one(s) of the guiding members. For instance when the guiding members are embodied as guiding arms, the upper one(s) of the guiding arms is/are longer than the lower guiding arms. Arranging the guiding surface(s) of the upper guiding member(s) further longitudinally outwards makes that these engage the upper end further inside the upper end. This not only increases the moment arm of the counteracting upwards force, such as to reduce the latter, but also ensures that when approaching the upper end the upper one(s) of the guiding members engage the upper end likely already prior to engagement of the lower guiding surface(s) as it extends further outwards so that it may start to apply the counteracting force directly as soon as the lower one(s) of the guiding members engage the inner surface. The effect is a further facilitation of the positioning of the tool and the control thereof.

To obtain a corresponding effect in an embodiment wherein the guiding surfaces are configured to engage an outer surface of the upper end, the guiding surface(s) of one or more lower ones of the guiding members may be arranged longitudinally further outwards than the guiding surface(s) of the remaining, upper one(s) of the guiding members.

In an embodiment, the pivot joint between the attachment member relative to the rigid frame allows the angle between the hoisting direction and the longitudinal direction of the tool to be changed, e.g. between 90 and 180 degrees, which enables that when the tool is connected to the longitudinal end, the position of the rigid frame, the gripping members and the guiding members relative to the longitudinal end may be retained when this angle changes, which is the case when the angle between longitudinal direction of the longitudinal end and the hoisting direction changes, e.g. during upending of the wind turbine component. In particular the pivot joint allows the orientation of the tool to be changed between a vertical orientation of the tool in which the longitudinal direction thereof corresponds to the hoisting direction, e.g. in line with the attachment member, and a horizontal orientation in which the longitudinal direction is parallel to or corresponds to the longitudinal direction of the longitudinal end, e.g. in which the attachment member extends in a radial direction of the tool.

In an embodiment, a pivoting between and into the mentioned vertical and horizontal orientation of the tool can additionally be actively driven by a pivoting actuator that is operative between the rigid frame and the attachment member. This enables that the tool may be attached to a lifting block of a crane in a position of the tool remote from the longitudinal end, e.g. on an upper deck of a vessel comprising the crane, while the tool is in the vertical orientation. For example the parts of the tool facilitating and establishing the connection to and retaining of the longitudinal end are arranged such that these in the vertical orientation extend in a longitudinal direction corresponding to the hoisting direction, pointing downwards and advantageously out of the way during the attaching of the attachment member to the lifting block. For example the tool is able to be supported in this orientation onto a horizontal surface, e.g. the upper deck, by itself, e.g. resting onto the guiding members which extend downwards furthest in the longitudinal direction. After the attachment, and a consequent suspension thereof from the crane at the remote position, the tool may be pivoted, e.g. prior to or during hoisting thereof towards the range of proximate positions, into the horizontal orientation of the tool to consequently engage the longitudinal end in the horizontal orientation, e.g. when the wind turbine component, e.g. monopile, is stored on an upper deck, e.g. with the outer end protruding outside the contour of the vessel.

In an embodiment, the guiding members and the gripping members are together rotatable relative to the attachment member around the longitudinal axis of the tool, as driven by an actuator operating in between the attachment member and the guiding and gripping members. For example the rigid frame to which the guiding members and gripping members are mounted is rotatable relative to the attachment member around the longitudinal axis of the tool. Such rotatability may further facilitate the positioning of the tool from the range of proximate positions to the gripping position, for instance by controlling the moment and location at the longitudinal end at which it is engaged by the guiding members and subsequently the gripping members. The rotatability may be provided by the pivot joint between the attachment member and the rigid frame, e.g. the pivot joint providing allowing pivoting around the longitudinal axis as well, e.g. the pivoting actuator driving this pivoting movement as well.

The pivot joint, in an embodiment, provides multiple degrees of freedom, e.g. allowing in addition to the pivoting around the radial horizontal axis, also pivoting around the longitudinal axis and/or a vertical radial axis of the tool, e.g. the pivoting movements around these axes being actively driven, e.g. by the pivoting actuator.

In an embodiment, the tool further comprises a lock mechanism, e.g. a mechanical lock mechanism, which is configured to, in a locking mode, block the pivoting movement relative to the attachment member, and in a release mode, enable the pivoting movement relative to the attachment member.

For example, the relative pivoting may be blocked at an angle of the tool relative to the hoisting direction that corresponds to the angle between the attachment member and the longitudinal direction of the tool while in the gripping position. This enables that the gripping members are at the same angle with the surface of the longitudinal end these are to engage during a movement of the tool from a proximate position to the gripping position. When the tool is this proximate position is in addition aligned with the gripping position, the movement to the gripping position constitutes a longitudinal movement only.

In an embodiment, the tool further comprises a camera that is connectable to a monitoring device external from the tool, arranged and configured such as to generate images showing a position of the tool relative to the longitudinal end In an embodiment the tool further comprises a power supply unit for supplying power to parts of the tool, including the gripping actuators and/or guiding actuators and/or pivoting actuators and/or other actuators, e.g. driving other movements of the tool, e.g. rotational movements of the gripping members and guiding members around the longitudinal axis of the tool, or e.g. movements to adjust a position and/or direction of the camera if present.

In an embodiment the gripping actuators, the guiding actuators, and if present the lock mechanism, and possible one or more actuators for directing the camera, if present, are remotely controllable by radio signals from an external control unit, e.g. at least partly based on the images generated by the camera, if present. In an embodiment, the actuators are controllable by an on-board control unit operating at least partly independently, e.g. at least partly based on the images generated by the camera, if present.

The invention also relates to a method for hoisting an longitudinal end of a wind turbine component which is in a horizontal orientation, e.g. a pile, for example a monopile or mast, and to retain the longitudinal end during hoisting thereof by means of a crane, e.g. in a process of upending said component. The method comprises the steps of:

(a) attaching a hoisting tool, preferably the hoisting tool according to the invention as described above, to a lifting block of a crane at a remote position of the tool, in which the tool is both longitudinally and radially spaced from said longitudinal end, e.g. on the upper deck of a vessel comprising the crane, (b) moving, by means of the crane, the tool into a proximate position thereof in which gripping members of the tool are longitudinally spaced from the longitudinal end and the radial contour of the tool at least overlaps with the radial contour of the longitudinal end, (c) while the gripping members are in a retracted position thereof, moving the tool from the proximate position into a gripping position longitudinally aligned with the longitudinal end, the gripping members each facing a surface of the longitudinal end, (d) moving the gripping members to an active position thereof, such that these engage said surface of the longitudinal end by a gripping surface thereof, thereby connecting the longitudinal end to the tool and suspending the longitudinal end from the lifting block, (e) hoisting by means of the crane the longitudinal end connected to the hoisting tool.

At least while the gripping members are still longitudinally spaced from the longitudinal end during step (c), and optionally step (b), guiding members of the tool engage by a guiding surface thereof the longitudinal end at mutually spaced angular locations on the longitudinal end which are spaced from the gripping members both radially, and longitudinally in the direction towards the longitudinal end, such as to restrict movement of the tool, and therewith of the gripping members, in at least radial directions relative to the longitudinal end, and maintain said engagement of the longitudinal end at least during step (c) such as to guide the tool into the gripping position, and optionally also during step (b), if engaged in this step, and/or in step (d), and if maintained during step (d), optionally also in step (e).

Step (c) of the method comprises, while the one or more guiding members engage the longitudinal end of the offshore wind turbine component by the one or more guiding surfaces, operating the one or more guiding actuators so as to drive a longitudinal movement of the respective guiding surfaces of the associated guiding members relative to the gripping members such that the tool is moved to the gripping position thereof. As explained in relation to the tool, the guiding surface may, for example, be moved by the associated guiding actuator relative to another part of the guiding member to which it is mounted, or the guiding member including the guiding surface may be moved relative to the gripping members, e.g. relative to the rigid frame to which the gripping members are mounted.

The moving of the tool in step (b) and said hoisting of step (c) is generally done by employing winches, e.g. motion compensating winches, hauling in and/or paying out hoisting cables between a boom of the crane and the lifting block.

In an embodiment, the guiding surface of at least one of the guiding members forms part of a circumferential surface of one or more rotatable elements, wherein at least one of said guiding actuators is configured to drive a rotation of said one or more rotatable elements, and wherein the movement of the guiding surfaces relative to the gripping members in step (c) comprises a rotational movement rolling the one or more rotatable elements of the tool over the surface of the longitudinal end.

In an embodiment of the method, the monopile or transition piece is, prior to step (b), in a horizontal position, e.g. being supported on a vessel, e.g. a jack-up vessel or a floating vessel, e.g. a feeder vessel, e.g. on a motion compensated platform of the vessel. Therein at least during step (c), and preferably also during step (d), the longitudinal direction of the tool is horizontal and a pivoting of the tool relative to the lifting block about a horizontal axis is blocked, and during step (e), enabled.

In an embodiment of the method the proximate position of step (b) is a position of the tool longitudinally aligned with the gripping position thereof, so that the movement of step (c) constitutes a longitudinal movement only.

In an embodiment wherein an upper end of a monopile is hoisted, the method further comprises, prior to step (b), the step of positioning the monopile in a monopile holder on an installation vessel while being in a horizontal orientation, e.g. parallel to a longitudinal axis of the installation vessel, wherein said monopile holder engages with a circumference of the monopile at a lower side thereof remote from the upper end to hold the monopile in order to limit movement of the lower side of the monopile in a direction perpendicular to a longitudinal axis of the monopile, so that in step (e) the monopile is upended.

In an embodiment, both ends of the component, e.g. monopile, are to be hoisted in step (e) by a crane, e.g. by the same crane. Therein two hoisting tools are used, one for each end to be hoisted, and steps (a) to (d) are executed twice, one time for each end to be hoisted. Therein the steps for the second end to be connected do not necessarily have to be executed after steps (a)-(d) for the first end—e.g. step (a) for the second end may be executed during or after a certain step for the first end. When both ends are to be hoisted by the same crane, the method described in WO2017217845 in relation to FIG. 18 thereof with two hoisting sheaves at the boom of the crane may be used. Therein the steps (b)-(d) are executed chronologically for each end after one another.

BRIEF DESCRIPTION OF THE DRAWINGS

The invention is now described with reference to the appended figures. Therein,

FIGS. 4A-B schematically show a fourth and fifth embodiment of the hoisting tool according to the invention.

DETAILED DESCRIPTION OF EMBODIMENTS

In FIGS. 1A-G, a hoisting tool 1 according to a first embodiment is shown. The hoisting tool 1 is configured for engaging and retaining an upper end 100 of a monopile during hoisting of said upper end 100, e.g. in a process of upending said monopile. Monopiles will generally be oriented horizontally oriented when stored on an upper deck of a vessel prior to upending and installation at an offshore location. Correspondingly the figures show the upper end 100 in a horizontal orientation, in a vertical cross-section thereof to illustrate the working principle of the tool.

The hoisting tool 1 has a longitudinal direction Lt and radial directions Rt with respect to the longitudinal direction Lt. The upper end 100 has a longitudinal direction Lm and radial directions Rm with respect to the longitudinal direction Lm.

Figure 1A:
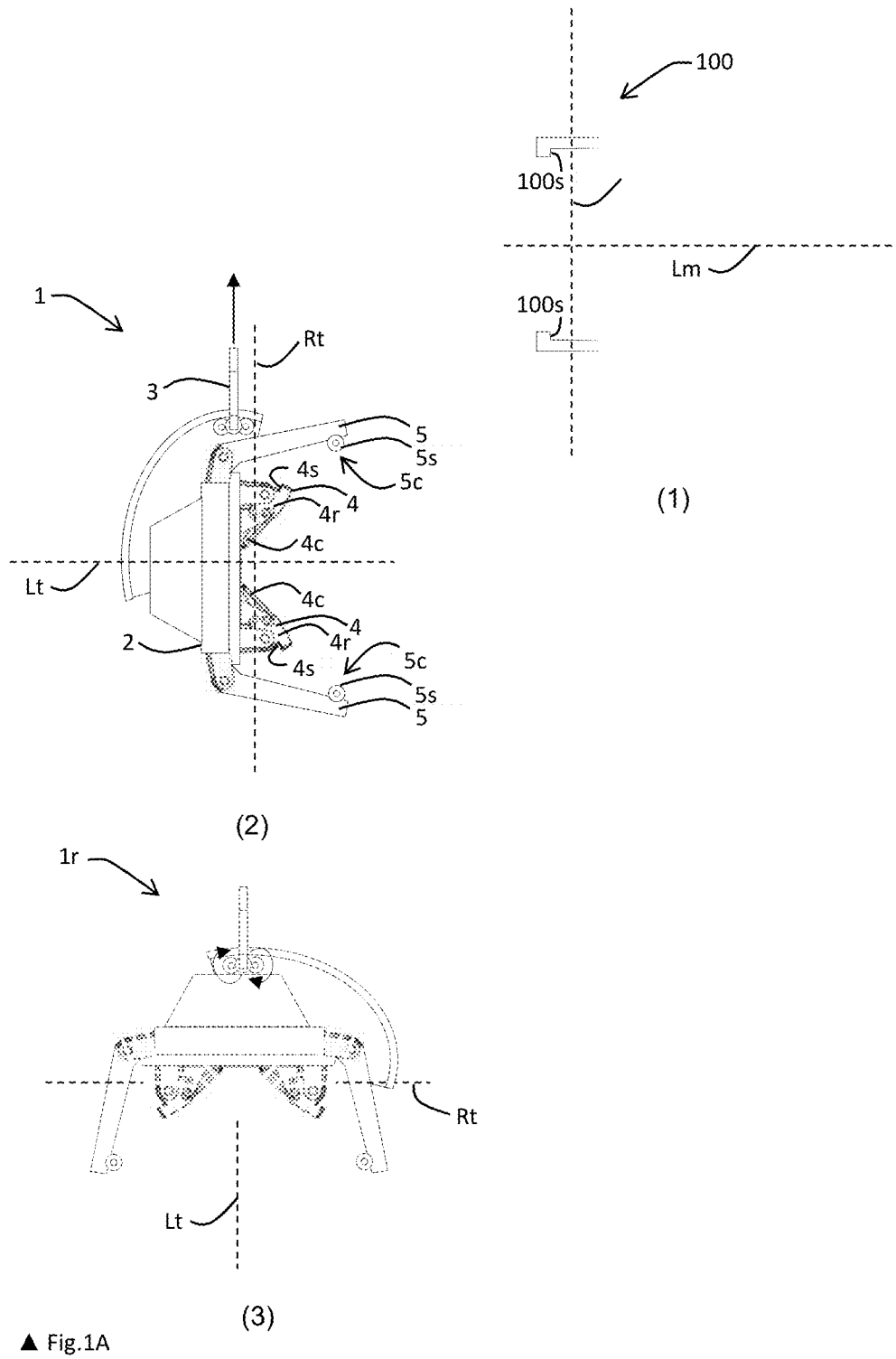
FIGS. 1A-G schematically show a first embodiment of the hoisting tool according to the invention in consequent steps of a method according to the invention, FIGS. 2A-E schematically show a second embodiment of the hoisting tool according to the invention in consequent steps of a method according to the invention, FIG. 3 schematically shows a third embodiment of the hoisting tool according to the invention.
Figure 1B:
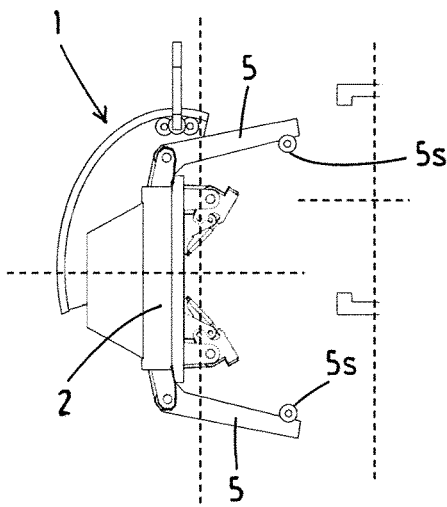

FIG. 1A shows the tool 1 being in two remote positions 1r, a lower remote position and a higher remote position, in which remote positions 1r the tool is longitudinally and radially spaced from the upper end 100—that is, the tool 1 extends both radially and longitudinally outside of the contour of the upper end 100. In the lower remote position the tool is, e.g., placed on the upper deck of a vessel comprising the crane.

FIG. 1A indicates that the tool 1 comprises a rigid frame 2. The rigid frame 2 is provided with an attachment member 3, which is configured to attach the tool 1 to a lifting block of a crane (not shown). Here the attachment member 3 comprises a vertically extending element which has a horizontal opening in the plane of the figure through which a hook of the lifting block is receivable to attach the tool 1 to the lifting block.

The attachment member 3 is pivotally connected to the rigid frame 2. This enables that the orientation of the tool can be adjusted between a vertical orientation in which the longitudinal direction Lt of the tool 1 corresponds to the hoisting direction, shown by the arrow in FIG. 1G, the attachment member 3 extending in this longitudinal direction Lt, and a horizontal orientation in which the longitudinal direction Lt is parallel to or corresponds to the longitudinal direction Lm of the upper end 100, the attachment member extending in a radial direction Rt thereof.

In a method according to the invention, in the lower remote position 1r of FIG. 1A the tool 1 is attached to a lifting block of a crane, the tool 1 being in the vertical orientation. In the vertical orientation of the tool 1 the parts of the tool 1 facilitating and establishing the connection to and retaining of the upper end extend in the longitudinal direction Lt are advantageously out of the way during said attaching of the attachment member 3 to the lifting block.

In a method step after the attaching of the attachment member to the lifting block, the rigid frame 2 is pivoted with respect to the attachment member 3 as indicated in FIG. 1A to the horizontal orientation, such that the longitudinal direction Lt of the tool 1 is parallel to the longitudinal direction Lm of the upper end 100, as in the higher remote position of FIG. 1A and in FIGS. 1B-1G. In the horizontal orientation the tool 1 can advantageously be connected to the upper end 100 when the upper end 100 is in a horizontal orientation, e.g. when stored on an upper deck, e.g. with the outer end protruding outside the contour of the vessel.

In this embodiment, the pivoting is accomplished by driving the rotation of the rollers of the attachment member 3 as indicated by the arrows, so that the rollers and therewith the attachment member 3 move along the circularly arched surface of the rigid frame 2.

Figure 1C:
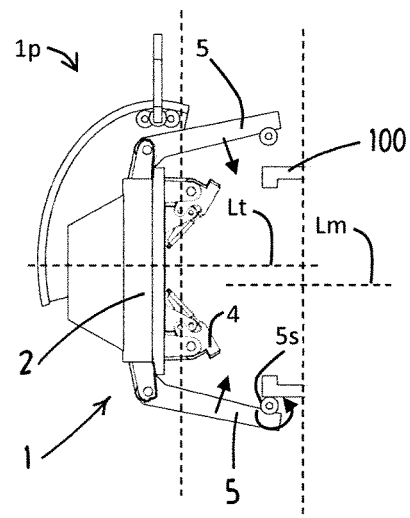

In a consequent or, e.g. partly, simultaneous step of the method the tool 1 is moved, e.g. by means of the crane, into a proximate position 1p thereof, shown in FIG. 1C, in which gripping members 4 of the tool are longitudinally spaced from the upper end but the radial contour of the tool at least overlaps with the radial contour of the upper end. The movement is shown by the advancement from FIG. 1A to 1C, intermediate positions being the higher remote position 1r of FIG. 1A, and the position of FIG. 1B.

As indicated in FIG. 1A, the rigid frame 2 is furthermore provided with two mobile gripping members 4, which are radially mutually spaced with respect to the longitudinal direction Lt of the tool 1, and with two gripper actuators 4c which are each associated with a respective one of the gripping members 4. The gripper actuators 4c are configured to drive a movement of the associated gripping members 4 into a retracted position 4r, shown in FIGS. 1A-1F, and into the active position 4a thereof, shown in FIG. 1G.

The rigid frame 2 is furthermore provided with two guiding members 5.

In this example, there are four guiding actuators (not shown), each respective guiding members 5 having two respective guiding actuators associated therewith.

The guiding members 5 are embodied as guiding arms 5, longitudinally extending further outwards from the rigid frame 2 than the gripping members 4.

FIGS. 1C to 1G illustrate how these gripping members 4 and the guiding members 5, including the actuators 4c, 5c thereof, are operated to connect the tool 1 to the upper end 100.

FIG. 1C shows the tool 1 in a proximate position thereof wherein the gripping members 4 are still longitudinally spaced from the upper end 100, but the radial contour of the tool 1 overlaps with the radial contour of the upper end, engage the upper end 100 by a guiding surface 5s of the guiding member 5. The lowermost guiding member 5 of the tool 1 engages by a guiding surface 5s thereof the upper end 100 at a lowermost angular location on the upper end 100. This lowermost angular location is spaced from the gripping members 4 both radially, and longitudinally in the direction towards the upper end 100. By the engagement, the lowermost guiding member restricts movement of the tool 1, and therewith of the gripping members 4, in at least the shown radial direction Rt relative to the upper end 100.

Figure 1D:
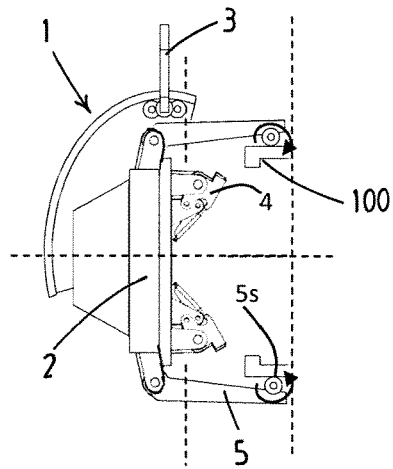
Figure 1E:
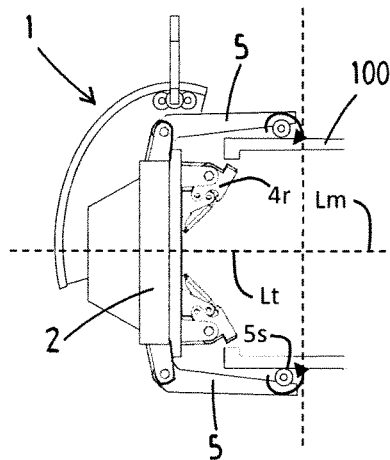
Figure 1F:
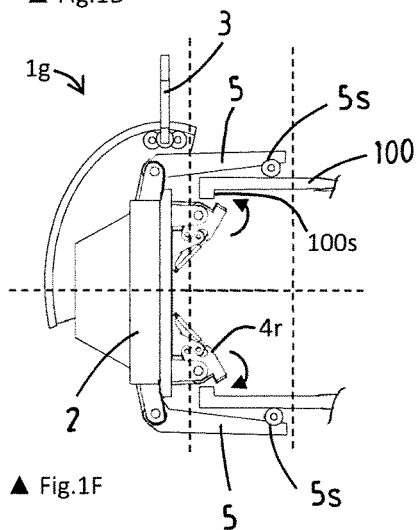

The advancement from FIG. 1C to 1F illustrates the movement of the tool 1 from the proximate position 1p of FIG. 1C thereof to the gripping position 1g thereof, shown in FIG. 1F, in which the tool 1 is longitudinally aligned with the upper end 100 and the gripping members 4 both face a surface 100s of the upper end 100, here an inner surface.

The guiding members 5 are used to guide the tool 1 into this position. Thereto the lowermost maintains its engagement of the upper end 100 during the movement from the proximate position of FIG. 1C to the gripping position 1g of FIG. 1F, such as to guide the tool into the gripping position 1g.

To further facilitate this guiding of the tool 1, the guiding members 5 are moved by the guiding actuators. A first guiding actuator, e.g. arranged between the frame and the guiding member, of the lowermost guiding member 5 pivots the lowermost guiding member 5 radially inwards relative to the rigid frame 2, as shown by the advancement from FIG. 1C to 1D, thereby moving the uppermost guiding member 5 radially towards the upper end 100. At the same time a first guiding actuator of the uppermost guiding member 5, e.g. arranged between the frame and the guiding member, also pivots the uppermost guiding member 5 radially inwards relative to the rigid frame 2, also moving it radially towards the upper end 100. By this pivoting the uppermost guiding member 5 is brought into engagement with the upper end 100 at an uppermost angular location on the upper end 100 to arrive at the position of FIG. 1D. In this position the gripping members 4 are still longitudinally spaced from the upper end 100, but the tool 1 is now in a position longitudinally aligned with the gripping position 1g of the tool 1.

In addition to the radial movement, her radial pivoting movement, of the guiding members 5, the guiding of the tool 1 involves a driven longitudinal movement of the guiding surfaces 5s of the guiding members 5 relative to the gripping members 4, namely the movement of the tool 1 from the position of FIG. 1D to the gripping position of FIG. 1F.

FIG. 1E shows an intermediate position. In this embodiment, thereto the guiding surfaces 5s of the guiding members 5 form part of a circumferential surface of a rotatable element, namely a driven roller. A second guiding actuator of both guiding members 5 drives a rotation of the respective roller, as indicated by the arrows, and therewith a longitudinal movement of the guiding surfaces 5s with respect to the gripping members 4 to move the tool 1, and therewith the gripping members 4 towards the gripping position 1g.

The actuated or motorized rotational movement of the guiding surfaces 5s makes the rollers of the tool 1 roll over the surface 100s of the longitudinal end 100, thereby moving also the gripping members 4 relative to the surface 100s as both the guiding members 5 and the gripping members 4 are mounted to the rigid frame 2.

In the shown method the longitudinal and radial movement of the tool 1 from the proximate position 1b, after engagement of the upper end 100, is done after the radial movement, however in other embodiments these movements may be driven simultaneously or even in reversed order. For instance as indicated in FIG. 1C, after the engagement of one of the guiding members 5 the longitudinal movement may already be initiated, here by driving the rotation of the guiding surface 5s by the second guiding actuator of the lowermost guiding member 5.

After engagement, the guiding members 5 maintain their engagement of the upper end 100 while moving the tool 1 from the proximate position 1p into the gripping position 1g, as is shown in FIGS. 1C-1F.

In the gripping position 1g of the tool 1 shown in FIG. 1F, the tool 1 is able to connect to the upper end 100 by means of the gripping members 4. Thereto, the gripper actuators move the gripping members 4 from the retracted position 4r thereof shown in FIG. 1F to an active position thereof, shown in FIG. 1G.

In the active position 4a the gripping members 4 are both configured to engage the surface 100s of the upper end 100 by a gripping surface 4s so as to connect the upper end 100 to the tool 1, thereby suspending the upper end from the lifting block, and to retain the upper end 100 during consequent hoisting thereof by means of the crane while the tool 1 is attached to the lifting block thereof.

In the retracted position 4r of the gripping members 4 relative to the rigid frame 2, the gripping members 4 enable passing of the gripping members 4 along a circumference of the upper end 100 during a movement of the tool 1 from a position of the tool 1 longitudinally spaced from the upper end 100 towards the gripping position 1g of the tool 1. This is illustrated in FIG. 1E.

Figure 1G:
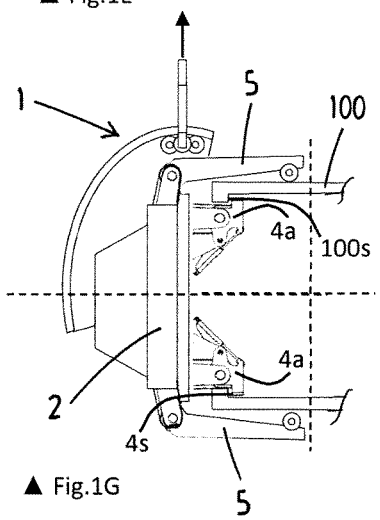

The gripper actuators 4c are configured to drive a movement of the associated gripping members 4 into the retracted position 4r and into the active position 4s thereof, when the tool 1 is in a the gripping position 1g shown in FIGS. 1F and 1G, the tool 1 being longitudinally aligned with and longitudinally within the contour of the upper end 100, the gripping members 4 each facing said surface 100s of the upper end 100 to be engaged.

In this embodiment, the gripping members 4 are embodied as mobile latching members, configured to latch onto the upper end 100, namely underneath a radially inward flange of the upper end 100 as shown.

Once connected and suspended, as shown in FIG. 1G, the upper end 100 can be hoisted by means of the crane, via the lifting block and the attached attachment member 3. This is indicated by the upwards arrow in FIG. 1G. The pivotal connection of the attachment member 3 to the rigid frame enables, during hoisting of the upper end 100 with respect to an opposite end of the monopile such as to thereby upend the monopile, the angle between the hoisting direction and the longitudinal direction Lt of the tool 1 to increase such as to keep retaining the upper end during the upending by the gripping members 4. During this hoisting the guiding arms 5 may maintain the engagement with the upper end 100. In this embodiment pivoting is possible until the longitudinal direction Lt corresponds to the hoisting direction—the tool 1 is then in the vertical orientation of the lower remote position in FIG. 1A again. The pivoting is enabled by allowing the shown rollers of the pivot joint to freely rotate clockwise over the circularly arched surface of the rigid frame 2, see FIG. 1G.

In FIGS. 2A-E, a hoisting tool 1 according to a second embodiment is shown. The hoisting tool 1 is configured for engaging and retaining an upper end 100 of a horizontally placed monopile during hoisting of said upper end 100, in a process of upending said monopile.

The hoisting tool 1 according to the second embodiment is in many respects similar to the first embodiment, and can in a similar fashion be used in a method of the invention as described for the first embodiment. The same parts of the tool 1 are indicated by the same reference numbers. The tool 1 including its parts, and the application of the tool 1 in the method, is therefore only shortly discussed here, however the same discussion as above for the first embodiment applies also for the second embodiment.

The hoisting tool 1 shown in FIGS. 2A-E has even as the first embodiment a longitudinal direction Lt and radial directions Rt with respect to the longitudinal direction Lt. The upper end 100 is in the FIGS. 2A-E again horizontally oriented.

The rigid frame 2 is provided with mobile gripping members 4, which are radially mutually spaced with respect to the longitudinal direction Lt of the tool 1, and with gripper actuators (not shown) which are each associated with a respective one of the gripping members 4. The gripper actuators are configured to drive a movement of the associated gripping members 4 into a retracted position 4r, shown in FIGS. 2A-D, and into the active position 4a thereof, shown in FIG. 2E. In this embodiment the gripping members 4 are embodied as a mobile friction clamp members, arranged in a circle at regular angular positions, and each configured to in the active position thereof frictionally engage the surface 100s of the upper end 100. These friction clamp members are wedge members, the gripping surfaces 4s moving, driven by the gripper actuators, radially and longitudinally outwards into the active position 4a to engage the surface 100s, and radially and longitudinally inwards into the retracted position 4r in which the gripping members 4 can pass along the inner circumference of the upper end 100 towards the gripping position 1g, compare FIGS. 2D and 2E.

The rigid frame 2 is furthermore provided with two guiding members 5 and associated guiding actuators, of which two guiding actuators in the form of hydraulic cylinders 5a are shown. Both cylinders 5a are associated with each of the guiding members 5, moving them longitudinally with respect to the rigid frame 2 together. In this embodiment the guiding members 5 are alike the first embodiment also embodied as guiding arms 5 longitudinally extending further outwards from the rigid frame 2 than the gripping members 4, however in this second embodiment the engaging surfaces 5s are not movable with respect to the respective guiding arms 5, but are embodied as frictional pads rigidly connected to the outward ends thereof. Not shown is that these pads are shaped complementary to the upper end 100, extending tangentially over an angular range of around 30 degrees. The guiding members 5 are alike in the first embodiment pivotal with respect to the rigid frame 2. Associated guiding actuators (not shown) drive this pivoting movement.

The FIGS. 2A-E illustrate respective method steps of the invention. In FIG. 2A the tool 1 is in a remote position in its vertical orientation. In this position the attachment member 2 is attached to the lifting block of a crane (not shown).

As shown the attachment member 3 comprises an arm rigidly connected to the vertically extending element comprising the opening receiving the hook of the lifting block. Also in this embodiment the attachment member 3 is pivotally attached to the rigid frame 2, enabling pivoting between the vertical and horizontal orientation of the tool 1, shown respectively in FIGS. 2A and 2B-E, in which the longitudinal direction Lm extends respectively parallel to the longitudinal direction Lm of the upper end 100 and in the hoisting direction, that is, in line with the attachment member 3. The hoisting direction is indicated by the arrow in FIG. 2E.

In this embodiment, the pivotal connection is realized by a pivot axle at a lower end of the arm of the attachment member 3 pivoting inside a receiving pivot element of the rigid frame 2. In the method, the pivoting of the tool 1 according to the second embodiment to the horizontal position of FIG. 2B is established by operating an actuator (not shown) acting between the attachment member 3 and the rigid frame 2.

FIG. 2B shows the tool 1 after the attachment to the lifting block, the subsequent pivoting into the horizontal orientation and hoisting thereof in a position within the radial contour of the upper end 100.

The advancement from FIG. 2B to 2C illustrates the method step of moving, e.g. by means of the crane, the tool into a proximate position 1p thereof in which the gripping members 4 of the tool 1 are longitudinally spaced from the upper end but the radial contour of the tool overlaps with the radial contour of the upper end. The arrows in FIG. 2B indicate that thereto the hoisting tool 1 is being moved by the crane vertically—though any horizontal movement is not excluded—and the guiding members 5 pivoted, in order for the guiding members 5 to engage the upper end 100 by their guiding surface 5.

In the proximate position of FIG. 2C the gripping members 4 are still longitudinally spaced from the upper end 100, while both guiding members 5 of the tool 1 engage by the guiding surfaces 5s thereof the upper end 100 at multiple angular locations on the upper end which are spaced from the gripping members 4 both radially, and longitudinally in the direction towards the upper end 100, such as to restrict movement of the tool 1, and therewith of the gripping members 4, in at least radial directions relative to the upper end 100, namely by the radial engagement and resulting form-lock and friction in shear-directions of the pads. The friction of the pads may be achieved by textured inner surfaces and/or by being made up of a material suitable for this purpose as known in the art.

The advancement from FIG. 2C to 2D illustrates the method step of moving the tool 1 from the proximate position 1p into the gripping position 1g longitudinally aligned with the upper end 100 shown in FIG. 2D. In this gripping position the gripping members 4 each face a surface 100s of the upper end 100, here an inner surface 100s of the upper end. During the movement, the gripping members 4 are still in a retracted position 4r thereof, to allow passing thereof into the upper end 100.

The arrows in FIG. 2C show that for the movement of the tool 1 into the gripping position 1g, the hydraulic cylinders 5a drive a common longitudinal movement of the guiding arms 5 relative to the rigid frame 2, and thereby to the gripping members 4, corresponding to a common longitudinal movement of the gripping members 4 relative to the upper end 100. The hydraulic cylinders 5a are thereto at one end connected to the rigid frame 2 and at the other end to a radially extending crossbar to the ends of which the guiding arms 5a are connected, so that the guiding arms 5a are advantageously movable together longitudinally with respect to the rigid frame 2. The ends of the crossbar hollow elements are provided which The advancement from FIG. 2D to 2E illustrates the method step of moving the gripping members 4 from the retracted position 4r to the active position 4a thereof, such that these engage the inner surface 100s of the upper end 100 by their gripping surfaces 4s. This engagement connects the upper end 100 to the tool 1 and suspends the upper end 100 from the lifting block.

From FIGS. 2B-E it may be verified that the guiding members 5 maintain their engagement of the upper end 100 while moving the tool from the proximate position 1p to the gripping position 1g, such as to guide the tool 1 into the gripping position 1g, and also while moving the gripping members their active positions 4a.

Once connected and suspended as in FIG. 2E, the upper end 100 can be hoisted by means of the crane, via the lifting block and the attached attachment member 3, as indicated by the upwards arrow. The pivotal connection of the attachment member 3 to the rigid frame 2 enables, during upending of the monopile or transition piece, the angle between the hoisting direction and the longitudinal direction Lt of the tool 1 to increase such as to keep retaining the upper end during the upending by means of the gripping members 4. During this hoisting the guiding arms 5 may maintain the engagement with the upper end 100. In this embodiment pivoting is possible until the longitudinal direction Lt corresponds to the hoisting direction—the tool 1 is then in the vertical orientation of the lower remote position in FIG. 2A again. The pivoting is enabled by allowing the pivot axle of the attachment member 3 to freely rotate counter clockwise with respect to the receiving pivot element of the rigid frame 2.

The embodiments shown in the figures are highly schematic and depict exemplary embodiments, of which several properties, e.g. the shape of the rigid frame, the attachment member 3, the number of gripping members 4 and the number of guiding members 5, the embodiment of connections and actuators are chosen to serve the purpose of a clear illustration.

Furthermore, these properties may be combined differently to obtain other suitable embodiments. For instance the pivoting connection between the attachment member 3 and the rigid frame 2 may be embodied differently without affecting the functionality of the gripping members 4 and guiding members 5. The same applies for the embodiment of the gripping members 4 relative to that of the guiding members 5.

FIG. 3 for example shows a third embodiment of the tool 1 which has the pivoting connection between the attachment member 3 and the rigid frame 2 of the first embodiment, has the gripping members 4 of both the first and second embodiments so as to render the tool 1 suitable for engaging a circumferential inward flange of an upper end 100 as well as a longitudinally extending inner surface of an upper end 100, and two guiding arms 5 as the guiding members 5, of which the guiding surfaces 5a are directed outwardly for engaging an inner surface of the upper end 100 to guide the tool 1 into the gripping position 1g, contrary to the guiding arms 5 of the first and second embodiment.

In particular, suitable embodiments are envisaged wherein the tool 1 comprises instead of two, three or more guiding members 5, in particular three or four guiding members 5, so as to facilitate the movement of the upper end 100 once engaged thereby being restricted in all radial directions, instead of only two, e.g. opposing, radial directions.

Embodiments are envisaged wherein the guiding members 5 comprise caterpillars instead of the rollers of the first embodiment, of which the circumferentially running surface forms the guiding surface 5s. Suitable embodiments are envisaged wherein the radial movability of the guiding surfaces is in instead of or in addition to the pivotability of the guiding members 5 relative to the rigid frame 2 realized by a radial movability of the surface 5s, e.g. the roller, the caterpillar, or the pad, relative to another part of the respective guiding member 5. In suitable embodiments the pivotability of the guiding members 5 may for instance also be replaced by a translational inward movability of the guiding members 5, or the guiding members 5 may as a whole not be movable at all with respect to the rigid frame—the movability of each guiding surface 5a being realized only by the movability of the guiding surface 5s relative to the remainder of the guiding member 5.

Embodiments are envisaged wherein the gripping members 4 are configured for engaging the an outer surface 100s of the upper end 100 by thereof instead of an inner surface as shown in the figures, for instance embodied as inwardly directed friction clamp members having inwardly directed gripping surfaces 4s.

Embodiments are envisaged wherein the pivotal connection between the rigid frame 2 and the attachment member 3 is embodied differently, and/or enables multiple degrees of freedom, e.g. wherein the rigid frame 2 is rotatable, e.g. driven by actuators, around the longitudinal axis Lt thereof, e.g. to further facilitate positioning of the tool 1 relative to the upper end. Suitable embodiments are envisaged in which the attachment member 3 is configured for being attached in other ways to the lifting block.

Embodiments are envisaged wherein the gripper members 4 and/or guiding members 5 are individually or together rotatable around a longitudinal axis with respect to the rigid frame 2, e.g. while engaging the upper end 100, e.g. to facilitate positioning of the gripper members 4 relative to the upper end.

Embodiments are envisaged wherein the gripper members 4 and/or the guiding members 5 or parts thereof are movable with respect to the rigid frame 2 in more and/or other directions than shown in the figures, e.g. to achieve the engagement thereof with the upper end 100 or to restrict and/or cause a relative movement of the tool 1, e.g. the rigid frame 2, relative to the upper end 100.

Embodiments are envisaged wherein the guiding members 5, or some of the guiding members, are immovable with respect to the rigid frame 2, e.g. rigid guidance members, e.g. rigid arms. For example, a pair of angularly spaced apart guiding members 5 is immovable on the frame 2, e.g. configured to be lowered with the gripping surfaces thereof onto the upward face area of the exterior of the horizontally oriented longitudinal end by means of the crane from which the tool is suspended. In embodiments, additionally one or more mobile mounted guidance members 5 are provided on the frame, e.g. pivotal, e.g. to engage upon command onto the longitudinal end at another location, e.g. the downward facing area.

Not illustrated in the figures is that the tool 1 may comprise a lock mechanism, e.g. a mechanical lock mechanism, which is configured to in a locking mode, block the relative pivoting movement of the attachment member 3 relative to the rigid frame 2, in particular in the horizontal orientation of the tool 1 in which the longitudinal direction thereof extends horizontally. In the method illustrated, the lock mechanism is in particular in the locking mode while moving the tool 1 from a remote position 1r to a proximate position 1p, and possibly also while moving the tool 1 from the proximate position 1p to the gripping position, to achieve that the tool 1 remains in the horizontal orientation during these movements.

The lock mechanism is configured to in a release mode, enable the relative pivoting movement of the attachment member 3 relative to the rigid frame. The lock mechanism is in particular in the release mode while hoisting the upper end 100 to upend the monopile.

FIG. 4A illustrates an embodiment of the tool 1 with three guiding arms, one upper and two lower guiding arms. Therein the guiding surfaces 5s are configured to engage the inner surface 100s of the upper end 100. As soon as the guiding arms 5 engage the upper end 100 the tool 1 may become partially or completely supported onto the engaged surface 100s of the upper end 100, as shown by the downwards arrow at the guiding surfaces 5s of the lower guiding arms 5. At this point for instance the hoisting cable from which the tool is suspended carries less weight of the tool, or becomes completely slack. A vertical force moment may result from the weight of the tool 1 around the points of contact of the lower guiding arm 5 with the inner surface. This force moment is then counteracted by an upwards pushing force by the guiding surface 5s of the upper guiding arm 5 against the inner surface 100, as shown by the upwards arrow at the guiding surface 5s of the guiding arm 5. To prevent the tool 1 from toppling, in the view of the figure counter clockwise, as a result of this force moment, the guiding surface 5s of the upper guiding arm 5 may be arranged longitudinally further outwards than the guiding surfaces 5s of the remaining, lower guiding arms 5. Thereto the upper guiding arm 5 is longer than the lower guiding arms 5. Arranging the guiding surface 5s of the upper guiding arm 5 further longitudinally outwards makes that it engages the upper end 100 further inside the upper end 100 than the guiding surfaces 5s of the lower guiding arms 5. This not only increases the moment arm of the counteracting upwards force, such as to reduce the latter, but also ensures that when approaching the upper end 100 the upper guiding arm 5 engages the upper end 100 likely already prior to engagement of the guiding surfaces 5s of the lower guiding arms 5 as it extends further longitudinally outwards, so that it may start to apply the counteracting force directly as soon as the lower guiding arms 5 engage the inner surface 100s. The effect is a further facilitation of the positioning of the tool 1 and the control thereof. In FIG. 4A two curved arrows show the actively driven rotational movement of the guiding surface 5s, by means of which the tool 1 pulls itself from the shown position towards the gripping position.

FIG. 4B shows an embodiment of the hoisting tool 1 in which a corresponding effect is obtained, while the guiding surfaces 5s are configured to engage an outer surface 100s of the upper end 100. The guiding surface 5s of the lower guiding arm 5 is thereto arranged longitudinally further outwards than the guiding surface 5s of the two remaining, upper guiding arms 5. The tool 1 is prevented from toppling upon being supported partially or completely by the upper end after engagement thereof by the guiding surface(s) 5s through the upwards force exerted by the guiding surface 5s of the lower guiding arm 5 onto the outer surface 100s of the upper end 100, as indicated by the upwards arrow. The downwards arrow at the location of the guiding surfaces 5s of the upper guiding arms 5 indicates the partial or complete support of the tool 1 by the upper end. The two arrows pointing to the right indicate the movement of the guiding arms 5 with respect to the rigid frame 2 for moving the tool 1 from the shown position towards the gripping position.

LIST OF REFERENCE NUMERALS 1 hoisting tool
1g gripping position of 1
1p proximate position of 1
1r remote position of 1
2 rigid frame of 1
3 attachment member of 1
4 gripping member of 1
4a active position of 4
4c gripper actuator of 4
4r retracted position of 4
4s gripping surface of 4
5 guiding member of 1
5c guiding actuators
5s guiding surface of 5
100 upper end
100s surface of 100
Lt longitudinal direction of the tool
Lm longitudinal direction of the monopile
Rt radial direction of the tool
Rm radial direction of the monopile

The invention claimed is:

1. A hoisting tool configured to engage a longitudinal end of an offshore wind turbine component which is in a horizontal orientation, and to retain the longitudinal end during hoisting thereof by means of a crane, the tool comprising a frame, provided with:

an attachment member, configured to attach the tool to a lifting block of the crane;

multiple mobile gripping members, angularly mutually spaced with respect to a longitudinal direction of the tool, each of the multiple mobile gripping members being configured to:
  in an active position thereof relative to the frame, engage a surface of the longitudinal end of the component by a gripping surface thereof when the tool is in a gripping position in which the tool is longitudinally aligned with and longitudinally within a contour of the longitudinal end, the gripping members each facing said surface of the longitudinal end, so as to connect the longitudinal end to the tool and retain the longitudinal end during hoisting thereof by means of said crane while the tool is attached to the lifting block; and
  in a retracted position thereof relative to the frame, enable passing of the gripping members along a circumference of the longitudinal end during a movement of the tool from a position of the tool longitudinally spaced from the longitudinal end towards the gripping position of the tool;
gripping actuators that are associated with at least one of the gripping members, and are configured to drive a movement of the associated gripping members into the retracted position and into the active position thereof, when the tool is in the gripping position;
one or more guiding members, each of the one or more guiding members being configured to, in a range of proximate positions of the tool, in which the gripping members are longitudinally spaced from the longitudinal end but a radial contour of the tool at least overlaps with a radial contour of the longitudinal end, engage the longitudinal end by a guiding surface of the guiding member, at mutually spaced angular locations on the longitudinal end which are spaced from the gripping surface of the gripping members both radially, and longitudinally in the direction towards the longitudinal end, such as to restrict movement of the tool, and therewith of the gripping members, in at least radial directions relative to the longitudinal end, and configured to, during a movement of the tool from said range of proximate positions in a direction towards the gripping position, maintain said engagement of the longitudinal end, such as to guide the tool towards the gripping position; and
one or more guiding actuators, associated with the one or more guiding members and configured to drive a movement of the guiding surfaces of the associated guiding members relative to the gripping members,
wherein the one or more guiding actuators are configured to, while the one or more guiding members engage the longitudinal end of the offshore wind turbine component by the one or more guiding surfaces, drive a longitudinal movement of the respective guiding surfaces of the associated guiding members relative to the gripping members such that the tool is moved to the gripping position thereof.

2. The tool according to claim 1, wherein the one or more guiding surface of the one or more guiding members are each driven relative to the respective gripping member by the one or more guiding actuators to cause the longitudinal relative movement and move the tool towards the gripping position thereof.

3. The tool according to claim 2, wherein the guiding surface of at least one of the guiding members forms part of a circumferential surface of one or more rotatable elements.

4. The tool according to claim 3, wherein the circumferential surface is of one roller or of two longitudinally spaced rollers of a longitudinally extending caterpillar, wherein at least one of said guiding actuators is configured to drive a rotation of said one or more rotatable elements.

5. The tool according to claim 1, wherein the one or more guiding actuators are further configured to drive a radial movement, wherein the respective guiding surfaces of the guiding members are radially moved relative to the gripping members, and wherein at least one of said guiding actuators associated with the at least one of the guiding members is configured to drive the radial relative movement.

6. The tool according to claim 1, wherein at least one of the gripping members is embodied as a mobile friction clamp member configured to, in the active position thereof, frictionally engage the surface of the longitudinal end, and/or
  wherein at least one of the gripping members is embodied as a mobile latching member configured to latch onto the longitudinal end to latch underneath a radially inward flange of the longitudinal end, when present.

7. The tool according to claim 1, wherein at least one of the guiding members is configured to engage an outer surface of the longitudinal end, the guiding surface thereof being directed radially inwardly and at least in said range of proximal positions extending radially outwards from the gripping surfaces of the gripping members.

8. The tool according to claim 1, wherein at least one of the guiding members is configured to engage an inner surface of the longitudinal end, the guiding surface thereof being directed radially outwardly and at least in said range of proximal positions extends radially inwards from the gripping surfaces of the gripping members.

9. The tool according to claim 1, wherein the attachment member is pivotally connected to the frame, such as to allow a relative pivoting movement between the gripping members and the guiding members of the tool mounted to the frame, thereby enabling, when the tool is connected to the longitudinal end, an angle between the component and the hoisting direction to increase during hoisting of the longitudinal end to upend the component from a horizontal to a vertical position while the hoisting tool is connected to the longitudinal end.

10. The tool according to claim 9, wherein the attachment member is pivotal around a radial horizontal pivot axis.

11. The tool according to claim 9, wherein the tool, further comprises a lock mechanism which is configured to:
  in a locking mode, block the pivoting of the attachment member relative to the frame; and
  in a release mode, enable the pivoting of the attachment member relative to the frame.

12. The tool according to claim 11, wherein in the locking mode, the blocking of the pivoting of the attachment member relative to the frame is in an orientation of the tool in which the longitudinal direction thereof extends parallel to or in line with the horizontal direction of the longitudinal end to be connected thereto.

13. The tool according to claim 1, wherein the one or more guiding members are embodied as multiple guiding members, arranged regularly angularly spaced from each other with respect to the longitudinal direction of the tool and embodied as guiding arms longitudinally extending further outwards from the frame than the gripping members wherein each guiding surface thereof being arranged at an outward free end of the respective guiding arm.

14. The tool according to claim 1, further comprising a power supply unit for supplying power to parts of the tool, including the gripping actuators and/or the guiding actuators.

15. The tool according to claim 1, further comprising a camera connectable to a monitoring device external from the tool, arranged and configured such as to generate images showing a position of the tool relative to the longitudinal end.

16. The tool according to claim 1, wherein the gripping actuators and the guiding actuators are remotely controllable by radio signals from an external control unit.

17. A method for hoisting a longitudinal end of an offshore wind turbine component which is in a horizontal orientation, the method comprising the steps of:
  (a) attaching the tool according to claim 16 to a lifting block of a crane at a remote position of the tool, in which the tool is both longitudinally and radially spaced from said longitudinal end;
  (b) moving, by means of the crane, the tool into a proximate position thereof in which the gripping members of the tool are longitudinally spaced from the longitudinal end and a radial contour of the tool at least overlaps with a radial contour of the longitudinal end;
  (c) while the gripping members are in a retracted position thereof, moving the tool from the proximate position into a gripping position longitudinally aligned with the longitudinal end, the gripping members each facing a surface of the longitudinal end;
  (d) moving the gripping members to an active position thereof, such that these engage said surface of the longitudinal end by a gripping surface thereof, thereby connecting the longitudinal end to the tool and suspending the longitudinal end from the lifting block; and
  (e) hoisting by means of the crane the longitudinal end connected to the hoisting tool,
  wherein at least while the gripping members are still longitudinally spaced from the longitudinal end during step (c), the guiding members of the tool engage by the guiding surface thereof the longitudinal end at mutually spaced angular locations on the longitudinal end which are spaced from the gripping members both radially, and longitudinally in the direction towards the longitudinal end, such as to restrict movement of the tool, and therewith of the gripping members, in at least radial directions relative to the longitudinal end, and maintain said engagement of the longitudinal end at least during step (c) such as to guide the tool into the gripping position, and
  wherein step (c) comprises, while the one or more guiding members engage the longitudinal end of the offshore wind turbine component by the one or more guiding surfaces, operating the one or more guiding actuators so as to drive a longitudinal movement of the respective guiding surfaces of the associated guiding members relative to the gripping members such that the tool is moved to the gripping position thereof.

18. The method according to claim 17, wherein the guiding surface of at least one of the guiding members forms part of a circumferential surface of one or more rotatable elements, wherein at least one of said guiding actuators is configured to drive a rotation of said one or more rotatable elements, and wherein the movement of the guiding surfaces relative to the gripping members in step (c) comprises a rotational movement rolling the one or more rotatable elements of the tool over the surface of the longitudinal end.

19. The method according to claim 17, wherein prior to step (b), the component is being supported in a horizontal orientation, wherein at least during step (c), the longitudinal direction of the tool is horizontal and a pivoting of the tool relative to the lifting block about a horizontal axis is blocked, and during step (e), said pivoting is enabled.

20. The method according to claim 17, wherein the proximate position of step (b) is a position of the tool longitudinally aligned with the gripping position thereof, so that the movement of step (c) constitutes a longitudinal movement only.

\* \* \* \* \*